United States Patent [19]

Biber et al.

[11] Patent Number: 4,752,831

[45] Date of Patent: Jun. 21, 1988

[54] FOCUSING SYSTEM FOR CAMERA APPARATUS

[75] Inventors: Conrad H. Biber, Needham; William T. Vetterling, Lexington; Donald S. Levinstone, Cambridge; Olin C. Brown, III, Lynnfield, all of Mass.

[73] Assignee: Polaroid Corporation, Cambridge, Mass.

[21] Appl. No.: 53,509

[22] Filed: May 15, 1987

Related U.S. Application Data

[63] Continuation-in-part of Ser. No. 864,840, May 20, 1986, abandoned.

[51] Int. Cl.⁴ .............................................. G03B 3/00
[52] U.S. Cl. .................................... 358/227; 354/400
[58] Field of Search ................ 358/227; 354/400, 402, 354/403

[56] References Cited

U.S. PATENT DOCUMENTS

| | | | |
|---|---|---|---|
| 4,240,727 | 12/1980 | Lermann et al. | 354/25 |
| 4,314,151 | 2/1982 | Suzuki et al. | 250/204 |
| 4,470,676 | 9/1984 | Kinoshita et al. | 354/406 |
| 4,500,925 | 2/1985 | Hanma | 358/227 |
| 4,550,995 | 11/1985 | Toyama | 358/227 |
| 4,584,704 | 4/1986 | Ferren | 358/227 |
| 4,614,975 | 9/1986 | Kaite | 358/227 |

FOREIGN PATENT DOCUMENTS

60-264168 12/1985 Japan .................................. 358/227

OTHER PUBLICATIONS

"Electronic Still Camera," Research Disclosure, Mar. 1984 239, pp. 92–95.
"Picture Processing by Computer", by Azriel Rosenfeld, Academic Press, Inc., 1969, pp. 179–193.

Primary Examiner—Thomas W. Brown
Assistant Examiner—L. C. Schroeder
Attorney, Agent, or Firm—Edward S. Roman

[57] ABSTRACT

An automatic focusing system for a camera apparatus utilizes a two-dimensional photosensitive array to determine image sharpness as a function of the image information sensed in both the rows and columns of individual photosensitive pixel elements. A transfer function may be imposed upon the electronic information signal derived from the two-dimensional photoresponsive array or, alternatively, upon the incident scene light to the two-dimensional photoresponsive array to center-weight the focus condition determining signal where the principle subject will be most likely framed.

20 Claims, 4 Drawing Sheets

FOCUSING SYSTEM FOR CAMERA APPARATUS

This application is a continuation-in-part, of application Ser. No. 864,840, filed May 20, 1986, now abandoned.

BACKGROUND OF THE INVENTION

1. Field of the Invention

This invention relates generally to a system for automatically focusing an objective lens in a camera apparatus and, more particularly, to a system for automatically focusing an objective lens in an electronic still image camera utilizing a photosensitive array to determine image sharpness.

2. Description of the Prior Art

Automatic camera focusing systems which rely upon the detection of image sharpness are well known in the art as described in U.S. Pat. No. 4,470,676, entitled "Focus Detecting Device", by T. Kinoshita et al., issued Sept. 11, 1984. Such automatic focusing systems which have been proposed for use in 35 mm photographic cameras generally utilize a linear array of photosensitive elements which sense a line across the image to be ultimately photographed. The individual photosensitive elements of the linear array are thereafter sensed to provide a focus indication signal which is ultimately used to move the objective lens of the camera to its optimal focal position. Such linear arrays, however, are quite limited in determining the optimum focal position since only one line across the image is sensed.

Two-dimensional photosensitive area arrays are widely used in video cameras and have been proposed for use in electronic still image cameras for recording image scene light. Such two-dimensional area arrays provide substantially more image information than the aforementioned line arrays and thus could provide a substantially better indication of the optimum focal position for the camera objective lens.

Therefore, it is a primary object of this invention to provide an automatic focusing system for a camera apparatus which system determines the optimal focal position as a function of image sharpness as sensed by a two-dimensional photoresponsive area array utilizing all of the photosensitive pixel element information in both rows and columns.

It is a further object of this invention to provide an automatic focusing system for an electronic still image camera utilizing the same two-dimensional photoresponsive array to first determine the optimal focal position of the objective lens and to thereafter sense the still image to be ultimately recorded.

Other objects of the invention will in part be obvious and will in part appear hereinafter. The invention accordingly comprises the mechanism and system possessing the construction, combination of elements and arrangement of parts which are exemplified in the following detailed disclosure.

SUMMARY OF THE INVENTION

A system for focusing an objective lens in a camera apparatus comprises a two-dimensional photosensitive array having a plurality of photosensitive elements arranged in rows and columns stationed to receive scene light in concert with the scene light transmitted by the camera objective lens. Means are provided for serially transmitting electronic information signals corresponding to the photoresponsive elements from the photosensitive array. Means respond to the electronic information signals to provide a first output signal as a select function of the accumulation of the electronic information signals in an ordered sequence from rows of adjacent photoresponsive elements and a second output signal as a select function of the accumulation of electronic information signals in an ordered sequence from columns of adjacent photoresponsive elements. Means are provided for combining the first and second output signals to provide a focus indication signal. Means also provide relative movement between the objective lens and the photosensitive array and operate to ultimately stop the movement in response to the focus indication signal at substantially the optimum focus condition of the objective lens. In its preferred mode, the camera apparatus is an electronic imaging still camera and the two-dimensional photosensitive array is stationed at the focal plane of the camera to receive the image scene light from a scene to be recorded by the camera subsequent to focusing the objective lens.

DESCRIPTION OF THE DRAWINGS

The novel features that are considered characteristic of the invention are set forth with particularity in the appended claims. The invention itself, however, both as to its organization and method of operation together with other objects and advantages thereof will be best understood from the following description of the illustrated embodiment when read in connection with the accompanying drawings wherein like numbers have been employed in the different figures to denote the same parts and wherein:

DESCRIPTION OF THE PREFERRED EMBODIMENTS

Figure 1A:
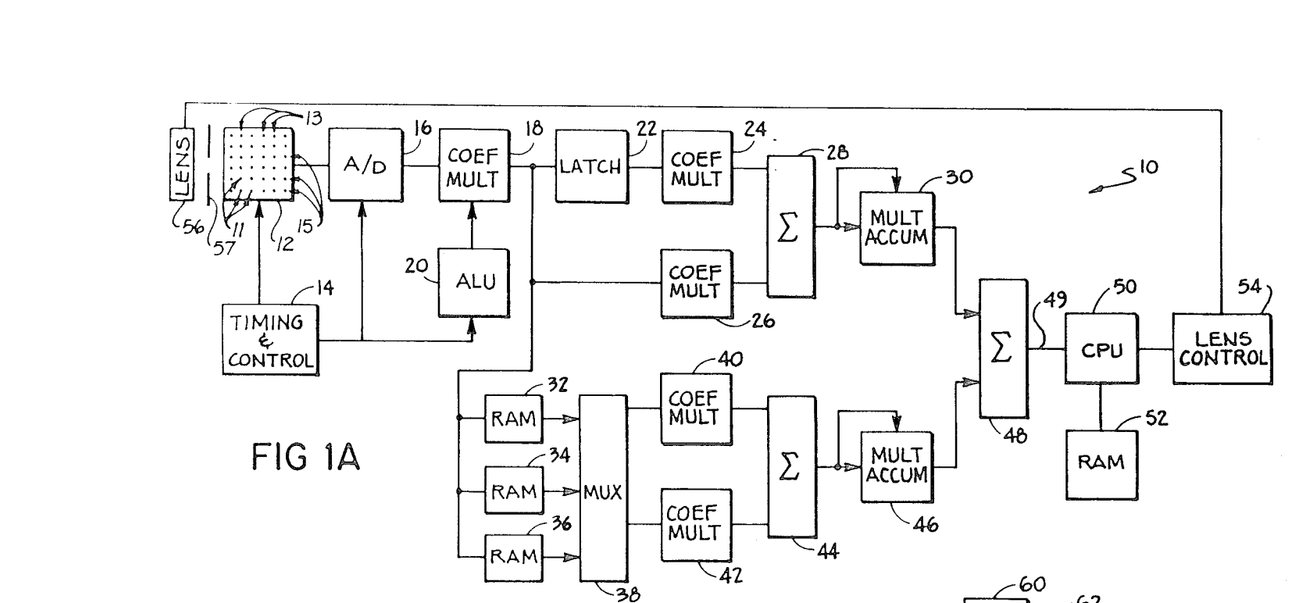
FIG. 1A is a schematic block diagram for the focusing system of this invention.

Referring now to FIG. 1A, there is shown at 10 a schematic block diagram for the system of this invention for automatically focusing an objective lens in a camera apparatus. The system comprises a two-dimensional photosensitive array as shown at 12 including a plurality of photoresponsive elements 9 that are arranged in horizontal rows and vertical columns wherein the first row is shown generally at 13 and the last column is shown generally at 15. The photoresponsive array 12 is preferably stationed to receive scene light by way of a camera objective lens 56. The photoresponsive array 12 may comprise a charge coupled device (CCD) which may be either of the frame transfer type or interline transfer type as is well known in the art. The electrical charge accumulated by each of the photoresponsive sensing elements 11 of the photoresponsive CCD array 12 in response to incident scene light is serially transferred in a well-known manner by shift registers (not shown) to an analog-to-digital converter 16 by means of timing pulses provided from a timing and control circuit 14.

The output signal from the analog-to-digital converter 16, in turn, is multiplied by a coefficient multiplier 18 in the manner of this invention to be subsequently described. The output digital electronic information signal, in turn, is stored momentarily by a latch 22 and thereafter multiplied by a coefficient multiplier 24 which, in this example, is set to multiply the output electronic information signal from the latch 22 by a coefficient of "−1". The output digital electronic information signal from the coefficient multiplier 18 is also directed to another coefficient multiplier 26 which for purposes of this example operates to multiply the electronic information signal by a coefficient of "1". The output signals from the coefficient multipliers 24 and 26, in turn, are added by a summing circuit 28, the output of which is thereafter squared by a multiplier accumulator circuit 30. Although the multiplier accumulator circuit 30 is described as squaring the output signal from the summation circuit 28, it will be well understood that other nonlinear transfer functions such as cubing, etc. may be imposed by another circuit in place of the circuit 30.

The digital electronic information signal from the coefficient multiplier 18 is also directed to input three random access memory (RAM) circuits 32, 34 and 36, the outputs of which input a multiplexer 38. The multiplexer 38, in turn, operates to serially transfer the digital electronic information signals from a select two of the random access memories 32, 34 and 36. The output electronic information signal from the multiplexer 38 is thereafter directed by way of two coefficient multiplier circuits 40 and 42 to input a summation circuit 44. For purposes of this example, the coefficient multiplier 40 operates to multiply the electronic information signal by a coefficient "−1" and the coefficient multiplier 42 operates to multiply the electronic information signal by a coefficient of "1". The output from the summation circuit 44, in turn, is directed to a multiplier accumulator circuit 46 which operates to square the output electronic information signal from the summation circuit 44 in the aforementioned manner. Again, although the multiplier accumulator circuit 46 is described as imposing a squaring function, it will be well understood that it may operate to impose other nonlinear transfer functions such as cubing, etc.

The output signals from the multiplier accumulator circuits 30 and 46, in turn, are combined by a summation circuit 48 to provide an output focus indication signal on line 49 in the manner of this invention. The output focus indication signal is thereafter directed to a central processing unit 50 which in conjunction with a random access memory (RAM) 52 operates to control the focus position of the camera objective lens 56 by way of a lens control 54. In the preferred embodiment the lens control 54 may comprise a stepper motor together with appropriate stepper motor control circuits for moving the lens in stepped increments through its plurality of different focal positions in a manner as will be more fully described.

Figure 2:
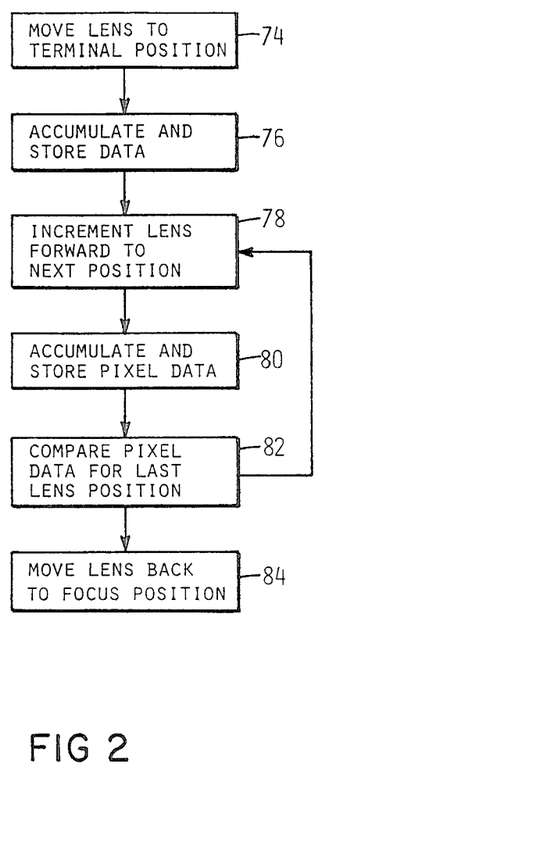
FIG. 2 is a flow chart for the operation of the automatic focusing system of FIG. 1A.

Referring now to FIG. 2 in conjunction with FIG. 1A, operation of the lens focusing system of this invention commences as follows with the central processing unit 50 signalling the lens control 54 to drive the camera objective lens to either its near terminal focal position or its far terminal focal position, as shown in block 74 of FIG. 2. With the camera objective lens 56 at one of its terminal positions, the shutter of the camera as shown schematically at 57 is opened to allow scene light transmitted by the objective lens 56 to be sensed by the photosensitive CCD array 12 in a well-known manner. Thus, each photoresponsive pixel element 11 in the rows 13 and columns 15 that make up the two-dimensional photoresponsive CCD array 12 accumulate electrical charge in proportion to the intensity of scene light incident thereon for a select exposure interval after which the camera shutter 57 is closed. It will be well understood that if the photosensitive array 12 comprises a non-light sensitive storage area, the shutter 57 would not be required and the exposure could be electronically controlled.

The electrical charge accumulated by the photoresponsive CCD array 12 is thereafter transferred in a serial manner as controlled by the timing and control circuit 14 to the analog-to-digital converter 16. The digitized electronic information signal is then multiplied by the coefficient "1" by the multiplier circuit 18 and directed for storage in the latch 22. The digital electronic information signal from the latch 22, in turn, is multiplied by the coefficient "−1" which is the transfer function of the coefficient multiplier 24. The digital electronic information signal corresponding to the next succeeding photoresponsive pixel element 11 in the row 13 of the photoresponsive CCD array 12 is multiplied by the coefficient "1" which is the transfer function for the coefficient multiplier 26. The outputs from the coefficient multipliers 24 and 26, in turn, are summed by the summation circuit 28 in the aforementioned manner.

In this manner, the latch 22 operates to delay the transfer of the digital electronic information signal for each photoresponsive pixel element 11 of the photosensitive CCD array 12 for sufficient time for it to be added by the summation circuit 22 to the digital electronic information signal corresponding to the next succeeding photoresponsive pixel element in each of the rows 13 of the photosensitive CCD array 12. Since the digital electronic information signal for each succeeding photoresponsive pixel element 11 has imposed thereon a "−1" transfer function by the coefficient multiplier 24, it then becomes readily apparent that the summation circuit 28 provides an output signal corresponding to the difference between adjacent photoresponsive pixel elements 11 in each of the rows 13 of the photosensitive CCD array 12. The digital electronic information signal output from the summation circuit 28 corresponding to the difference between adjacent photoresponsive pixel elements 11 is squared by the multiplier accumulator circuit 30 and thereafter directed to one input terminal of the summation circuit 48.

The digital electronic information signal from the coefficient multiplier 18 is also directed for storage in the random access memories 32, 34 and 36 with each random access memory storing the electronic information signals corresponding to all the photoresponsive pixel elements 11 in a single row 13 from the photosensitive CCD array 12. Thus, the random access memory 32 stores the digital electronic information signals corresponding to all the photoresponsive pixel elements in the first row of the photosensitive CCD array 12, and the random access memory 34 thereafter stores the electronic information signals for all the photoresponsive pixel elements 11 in the second row of the photosensitive CCD array 12.

Upon loading the random access memories 32 and 34 in the aforementioned manner, the multiplex circuit 38 thereafter operates to simultaneously output the random access memories 32 and 34 to the coefficient multipliers 40 and 42, respectively. Since the coefficient multiplier 40 operates to impose a "−1" transfer coefficient upon the electronic information signals, it then becomes apparent that the summation circuit 44 operates to provide an output electronic information signal corresponding to the difference between adjacent photoresponsive pixel elements 11 in the columns 15 of the photosensitive CCD array 12. While the multiplexing circuit 38 operates to transfer the electronic information signal from the random access memories 32 and 34 for the first two rows of photoresponsive pixel elements 11 to the coefficient multipliers 40 and 42, the random access memory 36 is loaded with electronic information signals corresponding to the third row of photoresponsive pixel elements 11 of the photosensitive CCD array 12.

After the difference between corresponding photoresponsive pixel elements 11 in the first two rows of the photosensitive CCD array 12 are combined by the summing circuit 44, the corresponding photoresponsive pixel elements 11 from the second and third rows, stored respectively in the random access memories 34 and 36, are directed by the multiplexer 38 by way of the coefficient multiplier circuits 40 and 42, respectively, for combination by the summation circuit 44. During the summation of the electronic information signals for the photoresponsive pixel elements 11 of the second and third rows, the random access memory 32 is loaded with electronic information signals corresponding to the photoresponsive pixel elements 11 from the fourth row of the photosensitive CCD array 12. As is now readily apparent, the aforementioned process continues until the last of the rows 13 is stored in the appropriate one of the random access memories 32, 34 or 36. Thus, in this manner, summations are made by the circuit 44 for the difference between adjacent photoresponsive pixel elements 11 in all the columns 15 of the photosensitive CCD array 12. The output electronic information signal from the summation circuit 44 is thereafter squared by the multiplier accumulator circuit 46 and subsequently directed to input the other terminal to the summation circuit 48.

The summation circuit 48, in turn, operates to sum the output electronic information signals from the multiplier accumulator 30 corresponding to the square of the difference between all the adjacent photoresponsive pixel elements 11 in all the rows 13 of the photosensitive CCD array 12 together with the output from the multiplier accumulator circuit 46 corresponding to the square of the difference between all the adjacent photoresponsive pixel elements 11 in all the columns 15 in the photosensitive CCD array 12. The output signal from the summation circuit 49 provides an indication of image sharpness and hence operates as a focus indication signal which reaches a maximum value upon the camera objective lens 56 being moved to its optimum focal position. The output signal from the summation circuit 48 on line 49 thus accumulated in the aforementioned manner is directed by the central processing unit (CPU) 50 for storage in the random access memory 52 in accordance with the "Accumulate and Store Data" block 56 of FIG. 2.

The central processing unit (CPU) 50 thereafter operates to signal the lens control 54 to incrementally move the objective lens 56 to its next discrete step away from its initial terminal position in accordance with block 78 of FIG. 2. The shutter 57 is again opened to admit scene light by way of the objective lens 56 to the photosensitive CCD array 12 so as to record image data in accordance with the new focal condition as established by the incremental movement of the camera objective lens 56. As previously discussed, in systems which did not include a shutter, the signal information would be transferred to the non-light sensitive storage area. The electronic information signal from the photosensitive CCD array 12 is thereafter accumulated in the aforementioned manner to provide the focus indication signal at the output line 49 from the summation circuit 48 in accordance with block 80 of FIG. 2.

The central processing unit 50 thereafter stores the focus indication signal also in accordance with block 80 of FIG. 2 and makes a comparison between the focus indication signal derived from the present lens position and the focus indication signal derived from the immediately preceding focus position of the objective lens 56. If the focus indication signal for the present lens position is greater than the focus indication signal for the immediately preceding lens position, the objective lens 56 is incremented forward by the aforementioned discrete step to the next succeeding position as shown in block 78 and the photosensitive CCD array 12 is again exposed to image scene light by way of the shutter 57. The image data is again accumulated and stored, and a new comparison is made between the present focus indication signal and the immediately preceding focus indication signal. The process continues until the peak focus indication signal is reached as determined by a decrease in the comparison between the last focus indication signal and the immediately preceding focus indication signal.

Since as is readily apparent in order to determine the peak focus condition signal, the objective lens 56 must be incrementally moved at least one step beyond its optimum focus position, it is thus necessary after the last comparison by the central processing unit 50 to move the objective lens 56 back one step towards its optimum focus position as shown in block 84. To assure that the actual peak focus position signal has been passed, it may be preferable to incrementally move the objective lens 56 a select number of steps beyond the optimum focus position to assure that each succeeding focus condition signal progressively decreases for a selected number of incremental steps. As is readily apparent, if the aforementioned comparisons are continued for a select number of steps beyond the optimum focal position of the objective lens 56, it will then be necessary to move the lens 56 back by the same select number of incremental steps to its optimum focus position.

Figure 3:
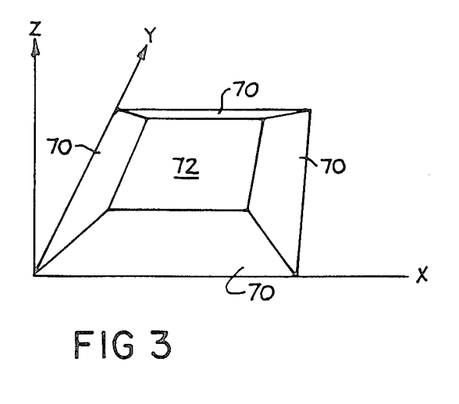
FIG. 3 is a three-dimensional graphical representation for a transfer function imposed by components of the automatic focusing system of FIG. 1A.

In the aforementioned example, the multiplier 18 imposed a unity transfer function to the electronic information signals and thus had no functional effect. However, it may be preferable to control the coefficient multiplier by way of an arithmetic logic unit 20 to provide a variable multiplier as a function of the location of the photoresponsive pixel element 11 within the photosensitive CCD array 12. Generally, a scene is framed and composed about a central subject about which it is generally preferable to focus and hence the photoresponsive pixel elements disposed about the central portion of the photosensitive CCD array should have more influence toward determining the optimum focal position for the objective lens 56. Toward that end, the arithmetic logic unit 20 may control the coefficient multiplier 18 to multiply the digitized electronic information signals received from the analog-to-digital converter 16 by a variable coefficient determined in accordance with the graph of FIG. 3 where the x-y plane is representative of the two-dimensional area of the photosensitive CCD array 12 and the z axis is representative of the transfer function imposed by the coefficient multiplier 18. Thus, it can be seen that the transfer function for the central area as shown at 72 may be "1" or higher with gradually decreasing coefficients toward the edges of the photosensitive CCD array 12 as shown graphically by the areas 70. The electronic information signals for those photoresponsive pixel elements located opposite the area 72 are therefore multiplied by the highest coefficient which is preferably equal to "1" or greater than "1", while those electronic information signals for the photoresponsive pixel elements opposite the area 70 are multiplied by coefficients which progressively decrease in the direction toward each edge. Although the arithmetic logic unit 20 is preferred, it is readily apparent that other circuits such as a look-up table could alternatively be used. In addition, other centerweighted transfer functions from that shown in FIG. 3 could alternatively be used.

Figure 1B:
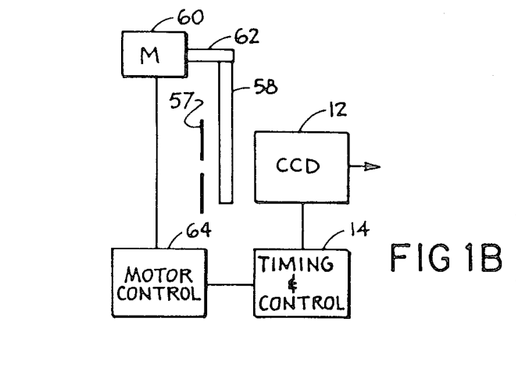
FIG. 1B is a schematic block diagram for an alternate embodiment of a portion of the automatic focusing system of FIG. 1A.
Figure 4:
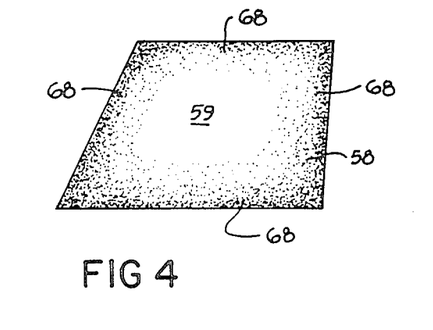
FIG. 4 is a perspective view of a diffusing screen used in the alternate embodiment of FIG. 1B.

Referring now to FIG. 1B there is shown an alternate arrangement by which the function of the coefficient multiplier 18 and arithmetic logic unit 20 can be provided by a variable diffusion screen 58 as best shown in FIG. 4. The diffusion screen 58 comprises a substantially clear light transmitting center portion 59 surrounded by regions of progressively increasing light diffusing portions 68. In electronic still imaging cameras where the photosensitive CCD array 12 is used subsequent to focusing to record the image of the scene, the light diffuser 58 may be rotatably mounted to a shaft 62 of a motor 60 which, in turn, is controlled by a motor control circuit 64 which rotates the light diffuser into overlapping relationship with the photosensitive CCD array 12 during the aforementioned focusing operation and out of overlapping relationship with the CCD array 12 during the subsequent image recording operation. In electronic still imaging cameras where the CCD array 12 is not the same array that would be used to sense and record the image subsequent to focusing, it is readily apparent that the diffuser 58 may be stationed in fixed overlapping relationship with respect to the photosensitive CCD array 12 or, alternatively, may be formed as an integral part of the objective lens.

Although the focusing system of this invention has been described as using a photosensitive CCD array 12, it will be readily apparent that other photosensitive arrays such as a charge injection device (CID) or a photodiode array may alternatively be used. As is well known in the art, signal charge stored in a CID array can be detected by measuring the charge that flows during transfer between row and column connected electrodes. This charge transfer readout method is non-destructive and thus the charge injection device is particularly well suited in an electronic imaging camera where the same photosensitive array is used for both focusing and subsequent image recording. In addition, the non-destructive and randomly addressable readout capabilities of the CID permit the use of the aforementioned focusing method without the need for RAM storage as provided by (RAM) 32, 34 and 36. Also, it will be readily understood that the invention is by no means limited to the specific coefficient multipliers described but may include other coefficient multipliers to enhance the focus indication signal and its insensitivity to noise. In addition, the multiplier accumulator circuits 30 and 46, although being described as providing a squaring function, could alternatively be substituted with other circuits to provide other nonlinear transfer functions such as cubing, etc. Although the photosensitive CCD array 12 is described as receiving scene light by way of the camera objective lens 56, it will also be readily apparent that an entirely separate lens system may be provided to operate in concert with the camera objective lens 56 to direct scene light specifically to the photosensitive CCD array 12. In this case, as is readily apparent, the photosensitive CCD array 12 would be used only for focusing and not for image recording as previously described. In addition although the objective lens 56 is described as being movable in incremental steps, it is also readily apparent that the objective lens 56 could be fixed in position and the photosensitive CCD array 12 moved relative to the objective lens. Also, the incremental steps through which the objective lens 56 moves need not be equal and preferably are smaller at the near focal positions than at the far focal positions.

Figure 5:
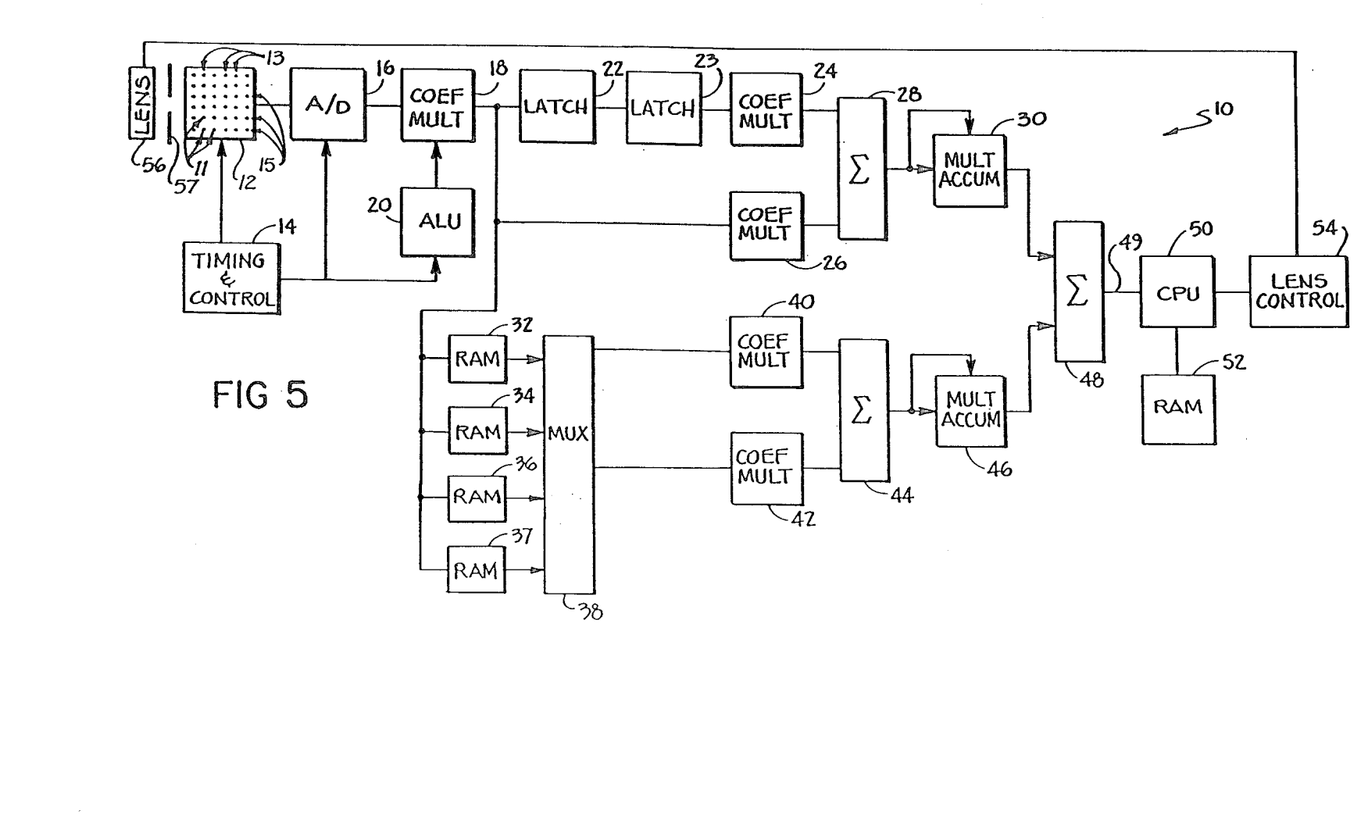
FIG. 5 is a schematic block diagram for a preferred embodiment for the focusing system of this invention.

Referring now to FIG. 5 where like numerals refer to previously-described components, there is shown a schematic block diagram for the preferred embodiment of the system of this invention. Between the latch 22 and coefficient multiplier 24, there is provided an additional latch 23. In addition, there is also provided an additional random access memory (RAM) circuit 37 in parallel connection with respect to the RAM circuits 32, 34 and 36.

The operation of the system as shown in FIG. 5 is in all respects identical to the operation of the aforementioned embodiment except for the following differences. Whereas in the aforementioned embodiment, the latch 22 operates to delay the transfer of the digital electronic information signal for each photoresponsive pixel element 11 of the photosensitive CCD array 12 for sufficient time for it to be added by the summation circuit 22 to the digital electronic information signal corresponding to the next succeeding photoresponsive pixel element in each of the rows 13 of the photosensitive CCD array 12, the serially connected latches 22 and 23 instead operate to delay the transfer of the digital electronic information signal for each photoresponsive pixel element 11 for sufficient time for it to be added by the summation circuit 22 to the digital electronic information signal corresponding to the second succeeding photoresponsive pixel element in each of the rows 13. Since the coefficient multiplier circuits 24 and 26 impose the transfer functions 31 1 and 1, respectively, it then becomes readily apparent that the summation circuit 28 provides an output signal corresponding to the difference between alternates pixel elements 11 in each of the rows 13 of the CCD array 12 for the preferred embodiment of this invention.

In the aforementioned manner, the random access memories (RAM's) 32, 34 and 36 each store in consecutive order the electronic information signals corresponding to all the photoresponsive pixel elements in a single row. Thus, the RAM 32 first stores the digital electronic information signals corresponding to all the photoresponsive pixel elements in the first row of the CCD array 12, the RAM 34 stores the digital electronic information signals corresponding to all the photoresponsive pixel elements in the second row of the CCD array 12, and the RAM 36 stores the digital electronic information signals corresponding to all the photoresponsive pixel elements in the third row of the CCD array 12. Upon loading the random access memories 32, 34 and 36 in the aforementioned manner, the multiplex circuit 38 thereafter operates to simultaneously output the random access memories 32 and 36 to the coefficient multipliers 40 and 42, respectively. Since the coefficient multiplier 40 operates to impose a "−1" transfer coefficient upon the electronic information signal, it then becomes apparent that the summation circuit 44 operates to provide an output electronic information signal corresponding to the difference between alternate photoresponsive pixel elements 11 in the columns 15 of the photoresponsive CCD array 12. While the multiplexing circuit 38 operates to transfer the electronic information signal from the RAM's 32 and 36 for the first and third rows of photoresponsive pixel elements to the coefficient multipliers 40 and 42, the RAM 37 is oaded with electronic information signals corresponding to the fourth row of photoresponsive pixel elements 11 of the photosensitive CCD array 12.

After the difference between corresponding photoresponsive pixel elements 11 in the first and third rows of the photosensitive CCD array 12 are combined by the summing circuit 44, the corresponding photoresponsive pixel elements 11 from the second and fourth rows stored, respectively, in the RAM's 34 and 37 are directed by the multiplexer 38 by way of the coefficient multiplier circuits 40 and 42, respectively, for combination by the summation circuit 44. During the summation of the electronic information signals for the photoresponsive pixel elements 11 of the second and fourth rows, the random access memory 32 is loaded with electronic information signals corresponding to the photoresponsive pixel elements 11 from the fifth row of the photosensitive CCD array 12. The electronic information signals corresponding to the pixel elements from the third and fifth rows, stored, respectively, in the RAM's 36 and 32, are nexted directed by the multiplexer 38 by way of the coefficient multiplier circuits 40 and 42, respectively, for combination by the summation circuit 44. During the summation of the electronic information signals for the pixel elements 11 of the third and fifth rows, the RAM 34 is loaded with electronic information signals corresponding to the pixel elements 11 from the sixth row of the photosensitive CCD array 12. As is readily apparent, the aforementioned process continues until the last of the rows 13 is stored in the appropriate one of the RAM's 32, 34, 36 or 37. In this manner summations are made by the circuit 44 for the difference between alternate photoresponsive pixel elements 11 in all the columns 15 of the photosensitive CCD array 12. Thus, the aforementioned preferred embodiment differs from the first-described embodiment by providing signals to the summation circuits 28 and 44 based on the difference between alternate pixel elements in each of the rows 13 and columns 15 in comparison to providing such signal based on the difference between adjacent pixel elements as described in regard to the first embodiment.

Other embodiments of the invention including additions, subtractions, deletions and other modifications of the preferred disclosed embodiments of the invention will be obvious to those skilled in the art and are within the scope of the following claims.

What is claimed is:

1. A system for focusing an objective lens in a camera apparatus comprising:

a two-dimensional photosensitive array comprising a plurality of photoresponsive elements arranged in rows and columns stationed to receive scene light in concert with the scene light transmitted by the camera objective lens;

means for serially transmitting electronic information signals corresponding to said photoresponsive elements from said photosensitive array;

means responsive to said electronic information signals for providing a first output signal as a select function of the accumulation of said electronic information signals in an ordered sequence from rows of adjacent photoresponsive elements and a second output signal as a select function of the accumulation of said electronic information signals in an ordered sequence from columns of adjacent photoresponsive elements;

means for combining said first and second output signals to provide a focus indication signal; and means for providing relative movement between the objective lens and photosensitive array and for ultimately stopping said movement in response to the focus indication signal at substantially the optimum focus condition of the objective lens.

2. The system of claim 1 wherein: said means for providing said first output signal includes means for storing the electronic information signal for each photoresponsive element for a select time until the electronic information signal for the next succeeding photoresponsive element is received and means for thereafter combining said stored electronic information signal with the electronic information signal for the next succeeding photoresponsive element to provide said first output signal; and said means for providing said second output signal includes means for storing the electronic information signal for each photoresponsive element in at least two rows of said array and means for thereafter combining the stored electronic information signal for each succeeding photoresponsive element in one of said stored rows with the stored electronic information signal for the immediately adjacent photoresponsive element in the other of said stored rows to provide said second output signal.

3. The system of claim 2 wherein said means for providing said first output signal includes first select function means for imposing a negative coefficient to one of said electronic information signals prior to its combination with the electronic information signal for the next succeeding photoresponsive element such that the subsequent combination of electronic information signals provides said first output signal corresponding to the difference between the electronic information signals of adjacent photoresponsive elements for each row and said means for providing said second output signal includes second select function means for imposing a negative coefficient to one of said electronic information signals prior to its combination with the electronic information signal for the immediately adjacent photoresponsive element such that the subsequent combination of electronic information signals provides said second output signal corresponding to the difference between the electronic information signals of adjacent photoresponsive elements for each column.

4. The system of claim 3 wherein said means for providing said first output signal includes first means for nonlinearly transforming the combined electronic information signals to provide said first output signal and said means for providing said second output signal includes second means for nonlinearly transforming the combined electronic information signals to provide said second output signal.

5. The system of claim 4 wherein: said means for combining electronic information signals within said first output signal providing means comprises a first summation circuit, said means for combining electronic information signals within said second output signal providing means comprises a second summation circuit, said means for combining said first and second output signals comprises a third summation circuit, and said first and second nonlinearly transforming means comprises, respectively, first and second squaring circuits.

6. The system of claim 1 including means for imposing a select transfer function to said electronic information signals subsequent to their serial transfer out of said photosensitive array and prior to their receipt by said first and second output providing means, said select transfer function operating to emphasize the value of said electronic information signals for those photoresponsive elements centrally disposed within said array and to deemphasize the value of said electronic information signals for those photoresponsive elements not centrally disposed within said array.

7. The system of claim 6 wherein said select transfer function imposing means comprises a coefficient multiplier for multiplying the electronic information signal received from said array for each photosensitive element by a select coefficient and an arithmetic logic unit for determining the coefficient by which said coefficient multiplier multiplies said electronic information signal as determined by said select transfer function.

8. The system of claim 1 including a diffusing means disposed in overlapping relation with respect to said photosensitive array, said diffusing means having a variable diffusing characteristic which provides for a substantially clear nondiffusing portion about the center thereof with substantially greater light diffusing portions disposed about the periphery thereof.

9. The system of claim 1 wherein the camera apparatus is an electronic imaging still camera apparatus and said two-dimensional photosensitive array is stationed at the focal plane of the camera to receive the image scene light from the scene to be recorded by the camera subsequent to focusing the objective lens.

10. The system of claim 9 comprising a diffusing screen having a variable diffusing characteristic which provides for a substantially clear nondiffusing portion about the center axis thereof with substantially greater light diffusing portions disposed about the periphery thereof and means for moving said diffusing screen into overlapping relation with respect to said photosensitive array prior to the focusing of the objective lens and out of overlapping relation with respect to said photosensitive array subsequent to the focusing of the objective lens and prior to the recording of the image scene light.

11. The system of claim 1 wherein said means for providing relative movement between the objective lens and photosensitive array and for ultimately stopping said movement at the optimum focus condition comprises means for providing incremental movement in discrete steps between the objective lens and said photosensitive array, means for storing the focus indication signal for each discrete step in the movement between the objective lens and said photosensitive array, and means responsive to the change in said focus indication signal for each of said discrete steps for computing that discrete step in the movement between the objective lens and photosensitive array at which the optimum focus condition exists and thereafter stopping said movement at said discrete step of optimum forcus.

12. The system of claim 11 wherein said means for providing said incremental movement comprises a motor drivingly engaged to the objective lens to move the objective lens in said stepped increments and said computing and stopping means operates to detect a change in the direction in which said focus indication signal is changing for a select number of stepped increments and thereafter controls said motor to drive the objective lens back said select number of stepped increments.

13. The system of claim 1 wherein: said means for providing said first output signal includes means for storing the electronic information signal for each photoresponsive element for a select time until the electronic information signal for the second succeeding photoresponsive element is received and means for thereafter combining said stored electronic information signal with the electronic information signal for the second succeeding photoresponsive element to provide said first output signal; and said means for providing said second output signal includes means for storing the electronic information signal for each photoresponsive element in at least three rows of said array and means for thereafter combining the stored electronic information signal for each succeeding photoresponsive element in one of said stored rows with the stored electronic information signal for the corresponding photoresponsive element in the second succeeding one of said stored rows to provide said second output signal.

14. The system of claim 13 wherein said means for providing said first output signal includes first select function means for imposing a negative coefficient to one of said electronic information signals prior to its combination with the electronic information signal for the second succeeding photoresponsive element such that the subsequent combination of electronic information signals provides said first output signal corresponding to the difference between the electronic information signals of alternate photoresponsive elements for each row and said means for providing said second output signal includes second select function means for imposing a negative coefficient to one of said electronic information signals prior to its combination with the electronic information signal for the corresponding photoresponsive element in the second succeeding one of said stored rows such that the subsequent combination of electronic information signals provides said second output signal corresponding to the difference between the electronic information signals of alternate photoresponsive elements for each column.

15. The system of claim 14 wherein said means for providing said first output signal includes first means for nonlinearly transforming the combined electronic information signals to provide said first output signal and said means for providing said second output signal includes second means for nonlinearly transforming the combined electronic information signals to provide said second output signal.

16. The system of claim 15 wherein: said means for combining electronic information signals within said first output signal providing means comprises a first summation circuit, said means for combining electronic information signals within said second output signal providing means comprises a second summation circuit, said means for combining said first and second output signals comprises a third summation circuit, and said first and second nonlinearly transforming means comprises, respectively, first and second squaring circuits.

17. A system for focusing an objective lens in a camera apparatus comprising:
   a two-dimensional photosensitive array comprising a plurality of photoresponsive elements stationed to receive scene light in concert with the scene light transmitted by the camera objective lens;
   a diffusing screen disposed in overlapping relation with respect to said photosensitive array, said diffusing screen having a variable diffusing characteristic which provides for a substantially clear non-diffusing portion about the center thereof with substantially greater light diffusing portions disposed about the periphery thereof;
   means for serially transmitting electronic information signals corresponding to said photoresponsive elements from said photosensitive array;
   means responsive to said electronic information signals for providing a focus indication signal as a function of the accumulation of said electronic information signals; and
   means for providing relative movement between the objective lens and photosensitive array and for ultimately stopping said movement in response to the focus indication signal at substantially the optimum focus condition of the objective lens.

18. The system of claim 17 wherein the camera apparatus is an electronic still camera apparatus and said two-dimensional photosensitive array is stationed at the focal plane of the camera to receive the image scene light from the scene to be recorded by the camera subsequent to focusing the objective lens and said system includes means for moving said diffusing screen into overlapping relation with respect to said photosensitive array prior to the focusing of the objective lens and out of overlapping relation with respect to said photosensitive array subsequent to the focusing of the objective lens and prior to the recording of the image scene light.

19. The system of claim 17 wherein said means for providing relative movement between the objective lens and photosensitive array and for ultimately stopping said movement at the optimum focus condition comprises means for providing incremental movement in discrete steps between the objective lens and said photosensitive array, means for storing the focus indication signal for each discrete step in the movement between the objective lens and said photosensitive array, and means responsive to the change in said focus indication signal for each of said discrete steps for computing that discrete step in the movement between the objective lens and photosensitive array at which the optimum focus condition exists and thereafter stopping said movement at said discrete step of optimum focus.

20. The system of claim 19 wherein said means for providing said incremental movement comprises a motor drivingly engaged to the objective lens to move the objective lens in said stepped increments and said computing and stopping means operates to detect a change in the direction in which said focus indication signal is changing for a select number of stepped increments and thereafter controls said motor to drive the objective lens back said select number of stepped increments.

* * * * *